United States Patent [19]

Buss

[11] 4,361,308
[45] Nov. 30, 1982

[54] VALVE ACTUATOR

[76] Inventor: Jack Buss, 660 S. 305th St., Federal Way, Wash. 98003

[21] Appl. No.: 139,432

[22] Filed: Apr. 11, 1980

[51] Int. Cl.³ .................................. F16K 31/04
[52] U.S. Cl. .................................. 251/134; 74/383; 192/141; 192/143; 192/150
[58] Field of Search .............. 251/134, 131; 74/383; 192/141, 143, 150

[56] References Cited

U.S. PATENT DOCUMENTS

| | | | |
|---|---|---|---|
| 1,734,419 | 11/1929 | Chitty | 251/134 X |
| 1,989,942 | 2/1935 | Parks et al. | 251/134 |
| 2,005,891 | 6/1935 | Elberty, Jr. | 251/134 X |
| 2,203,233 | 6/1940 | Panish | 251/134 |
| 2,815,922 | 12/1957 | Thomas et al. | 251/134 X |
| 3,170,339 | 2/1965 | Plume | 251/134 X |
| 3,863,888 | 2/1975 | Hines | 251/134 X |

Primary Examiner—Arnold Rosenthal
Attorney, Agent, or Firm—Seed, Berry, Vernon & Baynham

[57] ABSTRACT

A valve operator utilizes a disconnectable worm gear arrangement to drive a valve spindle. An hand crank may be used to disengage the power-driven worm gear arrangement and to manually drive the valve spindle, if necessary, by pivoting a bracket holding the end of the worm shaft. The worm gear is self-locking so that reaction forces from the valve cannot move the worm gear. A torque-sensing lever, responsive to axial movement of a highly torqued drive shaft, pivots against the force of a biasing spring to operate a microswitch to cut off electrical power to the drive motor for the valve operator should the torque exceed a predetermined amount. Additional protection against torque overload is provided by an adjustable mechanical clutch which operates in the event of control element failure or misadjustments. One or more microswitches, adjustable in position, are engaged by a traveler which moves along a lead screw driven by a gear arrangement coupled to the valve spindle to control operation of the actuator. The worm shaft is pivotable away from its normal axis of operation by means of a splined universal coupling.

6 Claims, 7 Drawing Figures

VALVE ACTUATOR

BACKGROUND OF THE INVENTION

1. Field of the Invention

This invention relates to power-driven valve actuators and, more particularly, to valve actuators which provide for optional manual operation, which provide for automatic disengagement of drive power, which provide adjustable electrical torque switches, which provide adjustable mechanical torque-overload protection and which provide adjustably positionable limit switches for operation of the valve connected thereto.

2. Prior Art

Various types of power-driven means for actuating valves are known. One such motor-driven device is shown in U.S. Pat. No. 2,203,233 which discloses a worm gear mechanism for operating a valve. To avoid straining or breaking the mechanism due to improper valve seating or an obstruction, a torque sensor detects axial movement of a worm shaft and cuts off electrical power to the drive motor when the reaction torque on the worm shaft exceeds a certain value. This particular torque sensor is operative in one direction only and cannot be used to detect both opening and closing torques in a valve. In the case of electrical power failure or a failure of the electrical drive motor, no provisions are made for manual operation of the valve.

Limit switches are often used to sense the position of a valve and to control operation of the actuator for the valve; however, such limit switches have not been readily adjustable to meet different valve operating conditions.

SUMMARY OF THE INVENTION

It is an object of this invention to provide a power-driven valve operator which includes provisions for manual disengagement of the power drive chain and for manual operation of the valve.

It is another object of the invention to provide a torque sensing arrangement for a power-driven valve operator which automatically disconnects power from the valve operator when a predetermined reaction torque level is encountered.

It is another object of the invention to provide a means for easily adjusting the position of various limit switches used for controlling the operation of a power-driven valve operator.

It is another object of the invention to provide a valve actuator utilizing a self-lockable gear drive.

It is another object of the invention to provide a valve actuator having adjustable mechanical torque overload protection to provide redundancy in the event of failure or misadjustment of an electrical overload protection system.

It is another object of the invention to further provide adjustable mechanical stops to mechanically prevent certain types of valves, such as butterfly valves, from turning too far.

Basically, these and other objects of the invention are achieved by a motor-driven valve operator having torque-sensing means, manual disengagement means, and limit switch adjustment means described below.

A torque sensor lever is pivoted to disengage the operator when excessive torque is encountered. The torque sensor lever is coupled to a worm drive shaft and is pivoted from an upright position by axial movement of the worm shaft in either direction due to excessive torque loading on the valve. The lever is spring-biased and has a switch attached thereto which is actuated when the lever pivots beyond a predetermined point to cut off electrical power to the drive motor.

The worm shaft may be manually disengaged from the worm gear using an auxiliary manually operated shaft which has a cam portion at its end. The cam engages and pivots a support bracket holding the free end of the worm shaft. A gear on the auxiliary shaft provides manual operation of the valve operator.

Electrical limit switches are adjustably mounted to the motor. A lead screw driven by the operator threadably engages an actuator plate for the switches.

DETAILED DESCRIPTION OF THE PREFERRED EMBODIMENT

Figure 1:
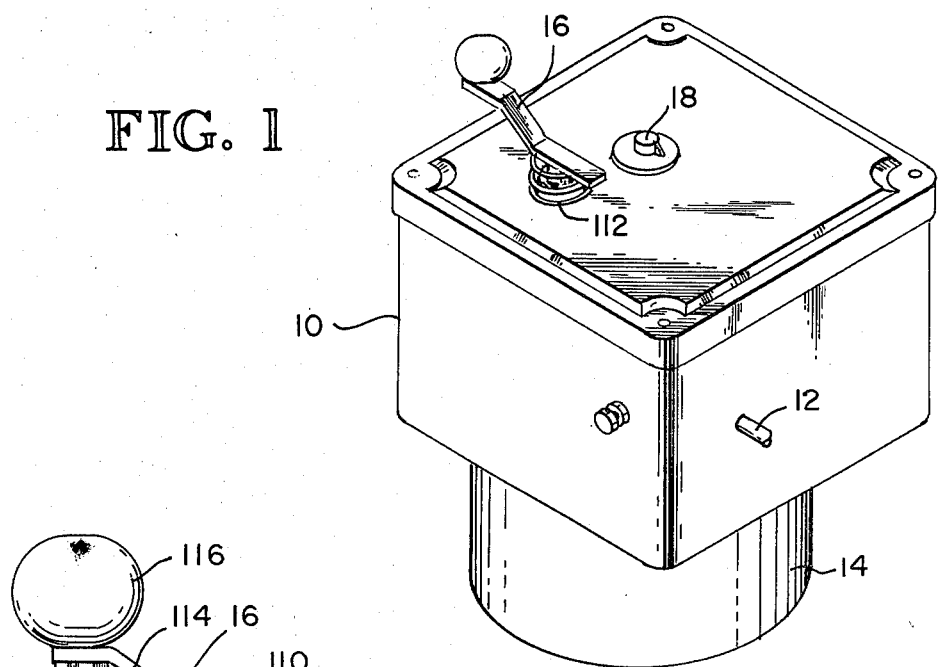
FIG. 1 is an external isometric view of a valve operator according to the invention.

Referring to FIG. 1, a valve operator 10 is shown which is driven by a shaft 12 from a conventional power source, such as an electric motor. The valve operator 10 is connected through a conventional gear case assembly 14 (not shown) to the stem of a valve (not shown). The gear case assembly 14 provides for torque multiplication to meet the requirements for a particular installation. A handle 16 is provided for manual operation of the valve. Contained within the valve operator 10 are adjustably positionable limit switches which are actuated by the valve operator to provide various control functions for the motor driving the shaft 12. The valve operator 10 also includes a mechanism for sensing valve torque and for automatically disconnecting the drive motor when that torque exceeds a predetermined value. The valve operator 10 is used with conventional fluid control valves, such as butterfly valves, ball valves and the like which are rotated through ninety degrees. An indicator 18 provides a visual indication of the valve position. The valve operator 10 is also used with valves such as gate valves which require a large number of revolutions for operation.

Figure 2:
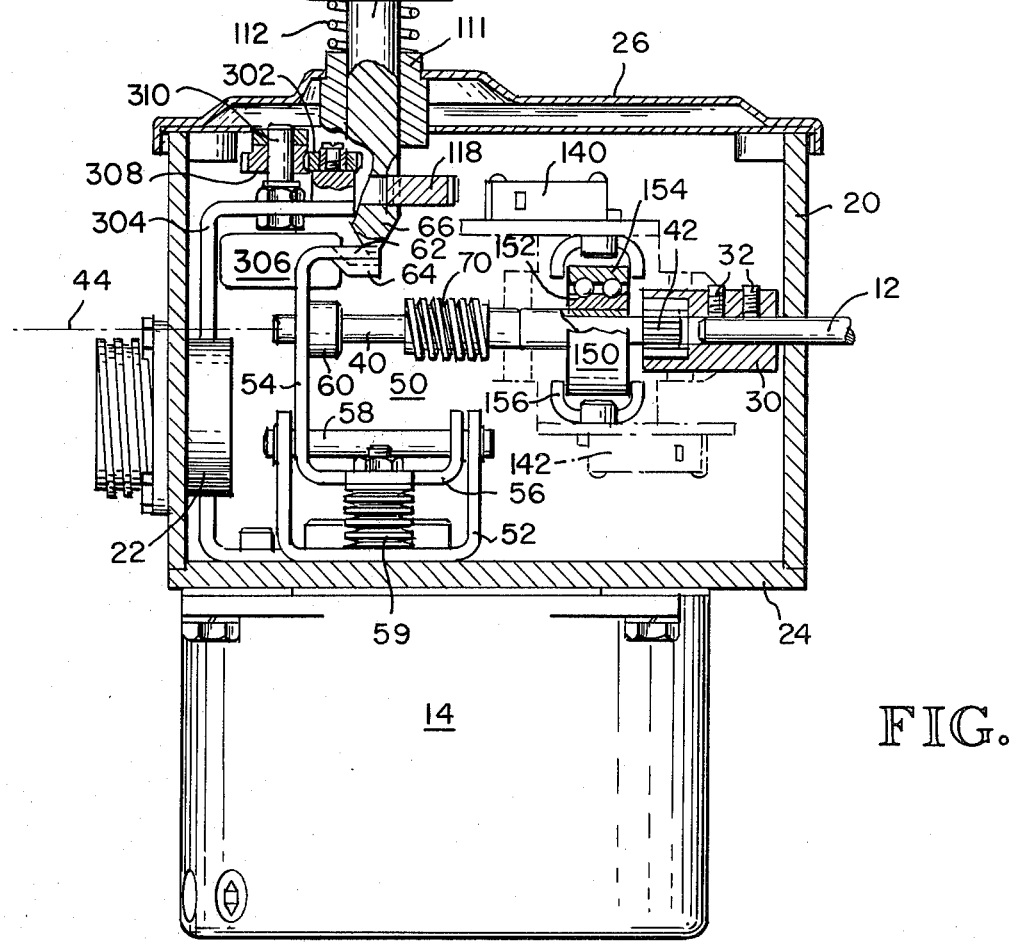
FIG. 2 is a partially sectional side elevation view of the power-driven valve operator taken along section line 2—2 of FIG. 3.
Figure 3:
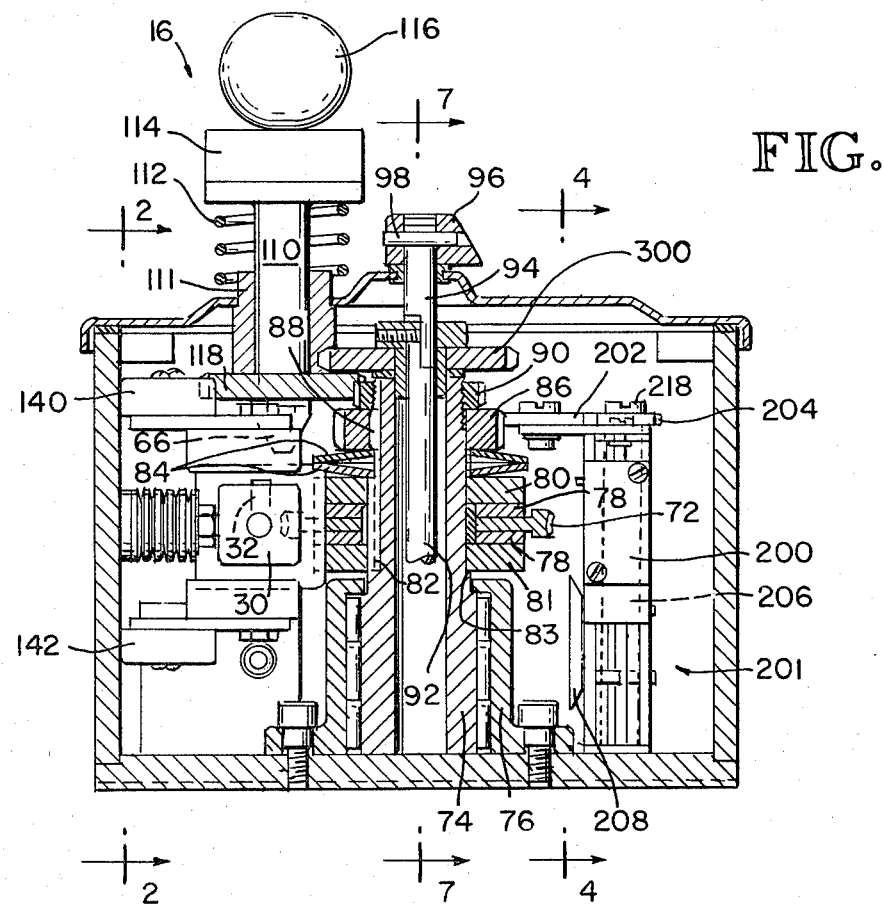
FIG. 3 is a partially sectional side elevation view of the valve operator taken along section line 3—3 of FIG. 5.

Referring to FIGS. 2 and 3, the valve operator components are shown mounted within a housing having a rectangular side-wall frame 20. A conventional power source (not shown), such as an electrical motor, drives the shaft 12. A multi-pin electrical connector 22 (see FIG. 2) extends through an aperture formed in another wall of the frame 20 to provide removable electrical connections for the valve operator 10. A bottom plate 24 and a top cover 26 interfit with the frame 20 to form the housing for the operator 10.

The power input shaft 12 has a coaxial coupling 30 attached by set screws 32 to the end of the shaft inside the housing. The coupling 30 is fitted with an insert which has internal axial splines formed therein. A splined end of a drive shaft 42 engages the splines of the coaxial coupling 30, providing a universal coupling. The splined end 42 of the shaft 42 is formed with an undersized chord and minor diameter and crowned near its ends so that it can pivot within the coupling 30 and thereby permit the shaft to pivot with respect to its normal axis of rotation 44. The splines permit the shaft 42 to move axially, when necessary. The other end of the drive shaft 40 is rotatably supported by a drive shaft support bracket assembly 50, shown in FIG. 2, which includes a U-shaped base bracket 52 fastened to the bottom plate 24. A C-shaped bearing support bracket 54 includes a U-shaped bottom portion 56 which fits within the upstanding arms of the base bracket 52. A series of coaxially aligned bores formed in the U-bracket 52 and the U-shaped portion 56 of the C-shaped bracket 54 receive a pin 58 which pivotally fastens the brackets 52,54 together so that the C-shaped bracket 54 is pivotable away from the axis 44 of the drive shaft. A spring 59 is fastened to the base of the U-shaped portion of the bracket 54 to bias the bracket 54 in an upright position. The vertical side member of the bracket 54 has a bearing 60 mounted thereupon which rotatably supports a pilot shaft portion of shaft 40 at is free end. The top horizontal arm 62 of the bracket 54 includes a downwardly angled portion 64, which is adapted to be slidably engaged by a cone-shaped end 66 of the handle assembly 16 to pivot the bracket 54 away from the drive shaft axis 44.

A worm shaft portion 70 of the drive shaft 40 drives a worm gear 72 shown in FIG. 3. This type of worm arrangement is self-locking so that the worm gear 72 cannot rotate the worm shaft 70, effectively locking the movable member of a valve in place unless the worm shaft 70 is rotated. The worm gear 72 is coupled to a valve drive spindle 74 by means of a pair of friction discs 78 fastened to the opposite faces of the worm gear 72. The valve drive spindle 74 is rotatably supported at its lower end by roller pin bearings contained within a bearing housing 76 bolted to the bottom plate 24. The faces of the friction discs 78 engage the corresponding faces of a pair of clutch plates 80, 81. The clutch plates 80, 81 are fixed to the drive spindle 74 with a key 82, with the lower clutch plate 81 stopped against a shoulder 83 formed on the drive spindle 74. Convex spring washers (Belleville springs) 84 apply a biasing force against the top clutch plate 80. A gear 86 is fixed to the drive spindle with another key 88. A lock nut 90 is threaded to the end of the drive spindle 74 and is adjustably positioned to control the biasing force provided by the spring washers 84. In the event of failure or misadjustment, the clutch arrangement provides a backup mechanical overload protection.

In operation, power is provided from the motor shaft 12 to the drive shaft 40. The worm shaft portion 70 of the drive shaft 40 operates the worm gear 72 to provide power through the clutch assembly 78, 80 to the valve drive spindle 74. The valve drive spindle 74 has a hollow, cylindrical chamber through its length. A lower indicator rod 92 extends through the drive spindle 74 and is connected to the gear case assembly 14. An upper indicator rod 94 is connected to the lower indicator rod 92. The upper indicator rod 94 is journaled in a bearing in the cover 26. A pointer 96 attached with a pin 98 provides a visual indication of the position of the movable member of a valve.

Referring to FIGS. 2 and 3, the handle assembly 16 is utilized both to disengage the worm shaft 70 from the worm gear 72 and to manually turn the valve drive spindle 74. The handle assembly 16 includes a vertically extending shaft 110 which extends through a bearing 111 in the cover 26. A spring 112 biases the shaft 110 in a direction away from the housing. A crank handle 114 is fixed to the end of the shaft 110 and has an operator knob 116 attached to its end. The end of the shaft 110 within the housing terminates in the cone-shaped end 66, with a drive gear 118 keyed to the shaft 110 above the cone-shaped end. When the handle assembly 16 is pushed into the housing, the cam end 66 engages the cam surface 64 of the support bracket 54 and pivots the support bracket 54 to disengage it from the worm gear 72. At the same time, gear 118 engages gear 86, attached to the valve drive spindle 74, to permit an operator using the handle assembly 16 to manually rotate the drive spindle 74.

Figure 6:
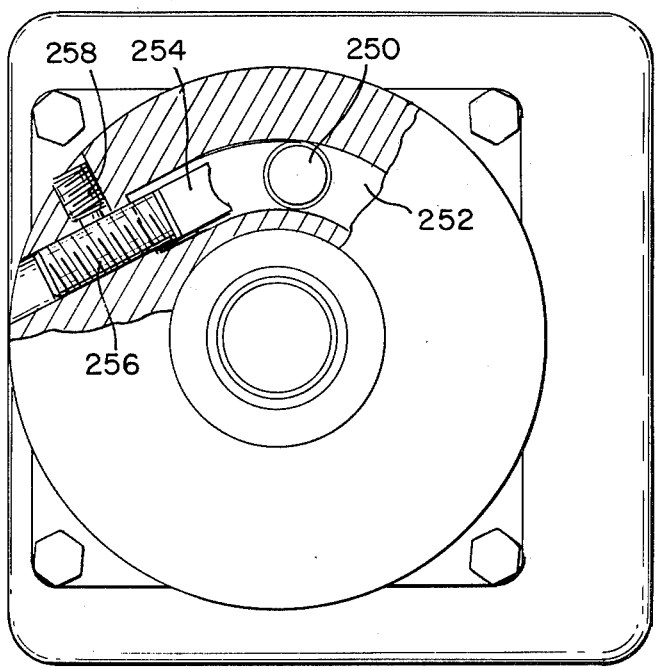
FIG. 6 is a partially broken-away bottom plan view of the valve actuator.

FIG. 6 shows a positive stop assembly for a butterfly valve which operates with a range of approximately ninety degrees mounted to the bottom of the gear case 14. A stop pin 250 is coupled to the valve and describes a radial path of approximately 90° within a groove 252. An adjustable stop block 254 on the end of a rod 256 is held in position by a set screw 258. The rotation of the valve is thus positively limited to approximately ninety degrees. It is evident that not using a ninety degree stop assembly of the type shown in FIG. 6 permits the valve operator 10 to be used with valve types, such as gate valves, which require many revolutions for operation. Nothing inherently prevents the valve operator 10 from being used with valves operated by multiple turns.

Figure 5:
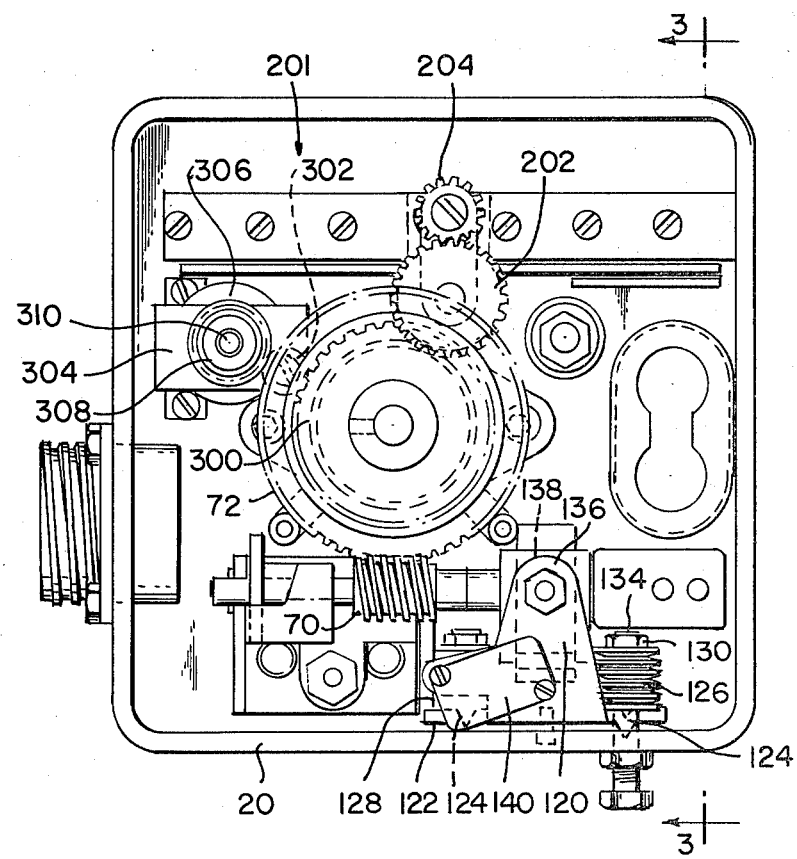
FIG. 5 is a partially sectional top plan view of the valve operator taken along section line 5—5 of FIG. 2.

When the worm gear 72 exerts an excessive reaction torque, the worm shaft threads wedge against the threads of the worm gear to cause it to move axially in one direction or the other, depending on the direction of rotation of the shaft. Excessive reaction torque occurs when the valve is driven to an extreme open or closed stop position, or occurs when the valve is obstructed or binds for one reason or another. A torque-sensing mechanism, responsive to axial movement of the worm shaft 70, includes a lever assembly 120 mounted to a wall of the housing 20 as shown in FIG. 5. A rectangular base plate 122 of the assembly 120 has downwardly extending protrusions 124 which serve as pivot points when the plate 122 tips. The base plate 122 is biased into an upright position by a pair of spring assemblies 126,128, each of which bears against the top surface of the base plate. Each spring assembly includes two concentric coil springs having oppositely turned coils to avoid entanglement with each other. The spring constants of the two springs are in a two-to-one ratio so that a range of spring forces is available—for example, one-third, two-thirds and three-thirds of the maximum—when either one or both springs are used. The outside ends of the springs 132, 134 are restrained by nuts which are threaded to shafts extending through the springs and base plate 122. The spring assemblies 126,128 provide biasing forces which must be overcome to tip the plate 122 in a direction along the axis 44 of the worm shaft 70. The lever assembly 120 also includes a pair of upstanding arms 136, 138, one on each side of the base plate 122. The lever assembly 120 is coupled to the shaft 40 with a double roll ball bearing assembly 150. The inner race 152 of the bearing 150 is fixed to the shaft 40 and the outer race 154 is held by a yoke bracket 156, which is fastened to the arms 136,138 of the lever assembly 120. Each of the arms 136, 138 has a switch 140,142 mounted thereto. The pushbutton of each switch engages the inside wall of the housing 20 when the lever assembly 120 is in its rest position. When the base plate 122 tips, due to the spring-biasing forces being overcome by the axial reaction force on the shaft 40, the pushbutton of one of the switches is released to stop the motor driving the operator. The base plate 122, biased by the spring assemblies 126,128, holds the shaft in position. Reaction forces are coupled through the worm gear 72 to the worm 70 and to the base plate 122. An axial reaction force component tends to tip the lever assembly 120 about one of the protrusions and such tipping is opposed by the biasing force provided by one of the spring assemblies 126,128. Until the lever assembly 120 begins to tip, the spring assemblies 126,128 bias the lever assembly 120 to the upright position and hold the shaft 40 in position. Excessive reaction torque trips the lever assembly 120 and cuts off the drive motor.

Figure 4:
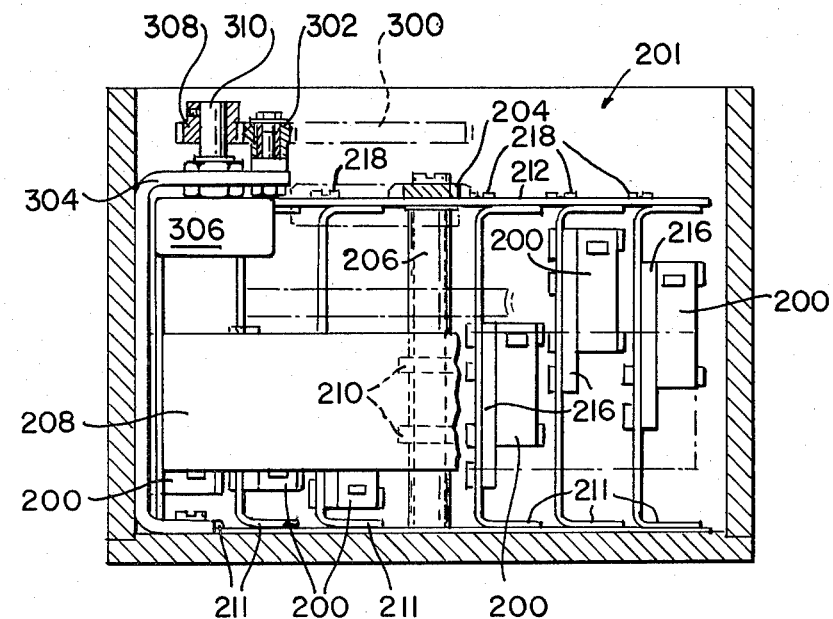
FIG. 4 is a partially sectional side elevation view of the adjustable limit switch actuation mechanism taken along section line 4—4 of FIG. 3.
Figure 7:
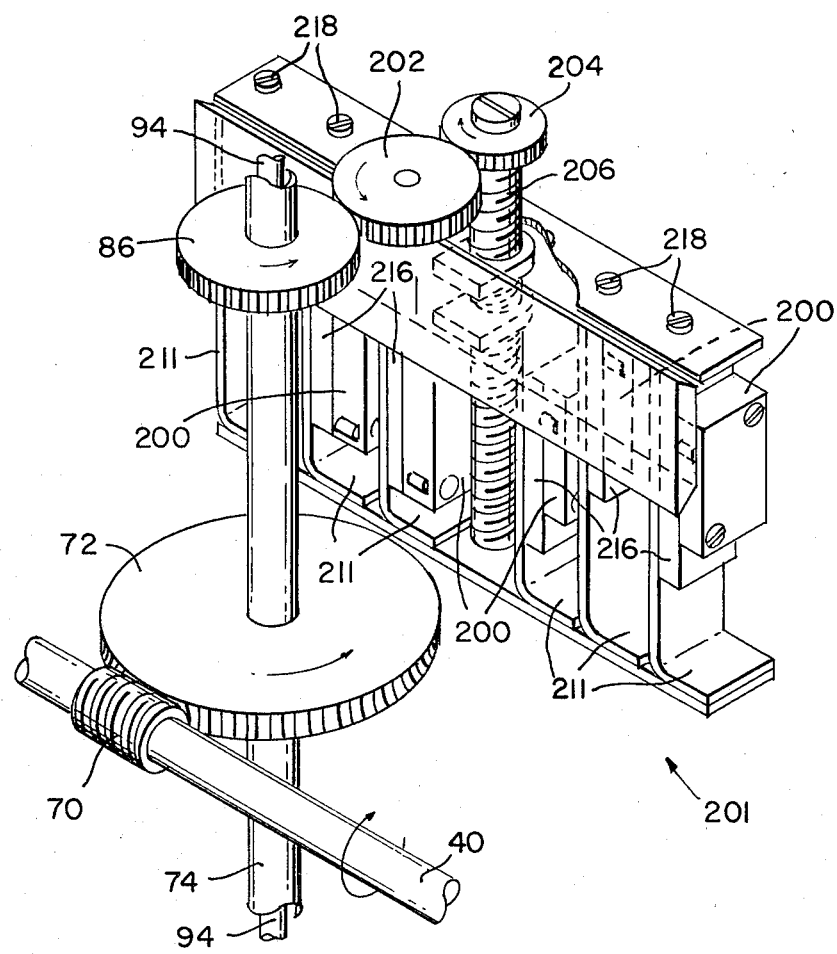
FIG. 7 is an isometric pictorial representation of adjustably positionable limit switches and the drive mechanism for actuating the switches.

FIG. 4 shows a plurality of limit switches 200 mounted within the housing on a frame 201. the switches 200 are actuated, for example, to control the degree of opening or closing of the movable valve member. The switch openings and closures also provide other control functions as required for a particular installation. The gear 86 is connected to the valve drive spindle 74 and engages an intermediate gear 202 mounted on the frame 201 as shown in FIGS. 3 and 7. The intermediate gear 202 drives a gear 204 at the end of a lead screw 206, shown rotatably mounted to the frame 201 in FIGS. 4, 5 and 8. An actuator plate 208 which travels vertically is mounted to a pair of nuts 210 which engage the lead screw 206.

The frame 201 as shown in FIG. 4 and represented in FIG. 7, includes a plurality of elongated brackets 211 with right-angled ends which are respectively fastened to horizontal top and bottom plates 212, 214. Each bracket 211 serves as a guide for one of a plurality of movable mounting bases 216, each of which has a switch 200 mounted thereto. The mounting bases 216 each have internally threaded apertures therethrough which are engaged by the threads of respective adjustment screws 218 which are rotatably journaled in the frame 201. Each switch is positioned along the frame 201 by adjusting the position of its mounting base 216 with a corresponding adjustment screw 218. The actuating plate 208 has beveled edges which gradually engage the switch pushbuttons as the plate is vertically moved. As the valve spindle 74 rotates, the actuating plate 208 is linearly moved in a vertical direction by the lead screw 206. The vertical position of the actuating plate 208 is made to correspond to the rotary position of a valve. The switches 200 are each adjustably positionable to electrically control the valve and auxiliary equipment as required.

FIG. 3 shows a gear 300 which is fixed to rotate with the valve drive spindle 74. FIGS. 2, 4 and 5 show an intermediate gear 302 rotatably mounted on a bracket 304, which is fastened to the housing 20. A potentiometer 306 is mounted to the bracket 304 and has a gear 308, which is mounted on the potentiometer shaft 310 and which engages the intermediate gear 302. The potentiometer shaft 310 is thus coupled to the valve drive spindle 74. The potentiometer 306 serves as a positional transducer conventionally providing an electrical output signal indicative of the position of the valve drive spindle 74 and, consequently, the position of the movable valve member. Note that linearly variable differential transformers and other similar transducer devices providing an indicative electrical output signal can be similarly coupled to the valve drive spindle 74. Coupling the transducers to the valve drive spindle in this manner eliminates backlash errors caused by the output gear train assembly to provide improved accuracy. The electrical output signals from a transducer device are used to drive conventional position indicating displays and other instrumentation circuits.

While a particular embodiment of the invention has been shown and described, it should be understood that the invention is not limited thereto since many modifications may be made. It is therefore contemplated to cover by the present application any and all such modifications that fall within the true spirit and scope of the basic underlying principles disclosed and claimed herein.

I claim:

1. A valve operator driven by a power source, comprising:
   a housing
   a worm gear within the housing coupled to the valve;
   a drive shaft coupled to said power source including a worm portion which is capable of engaging the worm gear;
   torque sensing means responsive to axial movement of said drive shaft, the torque sensing means including a pivotable support lever biased into a first position and having a bearing portion for engagement with the drive shaft, said pivotable support lever pivoted from its first position by axial movement of the drive shaft caused by excessive torque loading on the drive shaft to terminate delivery of power to the drive shaft;
   disengagement means for disengaging the worm portion of the drive shaft from the worm gear, including a drive shaft support bracket attached to said housing for biased pivotal movement, said bracket having a bearing engaging the drive shaft while permitting rotational movement thereof, the support bracket pivotal to permit disengagement of the worm portion of the drive shaft from the worm gear, the disengagement means including manually operated means for pivoting the bracket; and
   means for actuating a switch means responsive to movement of the valve to control the degree of opening or closing thereof, including a lead screw operatively connected to the drive shaft, a traveler threadably engaging the lead screw for movement parallel to the lead screw and engageable with said switch means and adjustable means for positioning the switch at positions parallel to the axis of the lead screw.

2. The operator of claim 1, wherein the drive shaft is coupled to the power source by a universal coupling permitting pivotal movement and axial movement of the drive shaft.

3. The operator of claim 1, wherein the torque sensing means includes a switch operable by the pivotable support lever responsive to exceeding of a predetermined torque.

4. The operator of claim 1, wherein the manually operated means includes an auxiliary shaft journaled to the housing for rotational and axial movement, said auxiliary shaft having a cam portion which is movable to an axial position to contact and pivot the drive shaft support bracket to disengage the worm portion of the drive shaft from the worm gear, the auxiliary shaft including a gear which is axially movable to couple the auxiliary shaft to the output spindle for auxiliary operation of the valve.

5. The operator of claim 1, wherein the adjustable means for positioning the switch along the axis of the lead screw includes an adjustably positionable mounting plate on which the switch is mounted.

6. The operator of claim 5, including an adjustment screw threadably engaging said mounting plate.

* * * * *